3,332,931
PRODUCTION OF DYES OF THE PERYLENE-
TETRACARBOXYLIC IMIDE SERIES
Willy Braun, Heidelberg, and Ernst Anton, Ludwigshafen (Rhine), Germany, assignors to Badische Anilin- & Soda-Fabrik Aktiengesellschaft, Ludwigshafen (Rhine), Germany
No Drawing. Filed May 8, 1964, Ser. No. 366,135
7 Claims. (Cl. 260—152)

This invention relates to a new process by which dyes of the perylenetetracarboxylic imide series can be prepared in a particularly advantageous way.

The production of vat dyes by reaction of perylene-3,4,9,10-tetracarboxylic acid or its anhydride with primary amines is known. The condensation is in general carried out with a large excess of the amine at elevated temperature. According to other literature references, this reaction will also succeed with a small excess of amine in the presence of a high boiling point diluent, for example nitrobenzene or o-dichlorobenzene, and an agent which promotes elimination of water, such as anhydrous zinc chloride or iron chloride. Zinc chloride is also recommended as catalyst and water-eliminating agent for the reaction of perylenetetracarboxylic acid with a great variety of amines in British patent specification No. 887,971, German patent specification No. 1,132,272 and in Belgian patent specification No. 580,343. Such condensing agents are the more important, the lower the basicity and consequently the less reactive the amine in question is.

We have now found that the condensation of perylene-3,4,9,10-tetracarboxylic acid or its anhydride with primary amines may be more advantageously influenced by using a zinc or cadmium salt of an organic carboxylic acid as the condensation auxiliary. Purer condensation products are obtained by the process according to this invention, the reaction periods are shorter and the reaction may be carried out at lower temperatures. The condensation proceeds much more smoothly particularly with weakly basic amines.

The organic anions of the zinc and cadmium salts used in the new process may originate from aliphatic, hydroaromatic, aromatic, aromatic-aliphatic and heterocyclic carboxylic acids. Polybasic carboxylic acids are also suitable, for example dibasic acids such as phthalic acid. The fatty acids are in general particularly easily accessible industrially and economically. The use of their zinc and cadmium salts is therefore particularly recommended. Examples are zinc formate, zinc acetate, zinc propionate, zinc butyrate, zinc stearate. The zinc salts of hexahydrobenzoic acid, benzoic acid, phthalic acid, phenylacetic acid and nicotinic acid and the corresponding cadmium salts, such as cadmium acetate, may also be given as examples of salts for use according to this invention. Mixtures of salts of different organic acids may also be used. It is however not necessary to add ready made zinc salts or cadmium salts to the radiation mixture; on the contrary, zinc oxide or cadmium hydroxide may be added and these may be converted into the salts with the carboxylic acid in question in the reaction mixture. 0.1 to 1 mole of the organic salt, with reference to the perylenetetracarboxylic acid or anhydride, is sufficient as the condensing agent. Larger amounts may also be used.

The condensation is advantageously carried out in high boiling point solvents, for example trichlorobenzene, diphenyl, diphenylene oxide, the liquid eutectic mixture of diphenyl and diphenylene oxide or diethylaniline, by heating to 150° to 330° C. Quinoline is particularly suitable. In some cases it is advantageous to use mixtures of solvents, for example a mixture of trichlorobenzene and quinoline, as the condensation medium. Particularly pure products are obtained when working in high boiling point solvents at about 200° C. or more. When using solvents of lower boiling points for example pyridine, it is recommended that the condensation be carried out in the said temperature range in autoclaves.

Apart from the advantages which accrue from the new process because it permits milder condensation conditions, it is also particularly suitable in the reaction of perylenetetracarboxylic acid with amines which change under the action of zinc chloride or iron chloride and enter into secondary reactions; 4-aminoazobenzene, for example, forms under the prior art conditions compounds like induline as byproducts and these cause cloudiness in the dyes formed. Condensation of o-aminoazotoluene, 4-amino-2-methyl-4'-chloroazobenzene or 4-phenylazo-1-naphthylamine, when carried out by the process according to this invention, also proceeds without secondary reactions of the amines used. Another advantage of the new process is that difficulties which often occur in the processing of the condensation products prepared using zinc chloride or iron chloride, are not observed.

The new process is particularly valuable in the case of amines which under conventional conditions can only be condensed with great difficulty, or not at all, with perylenetetracarboxylic acid or its anhydride, as for example in the case of aminoanthraquinones. German patent specification No. 386,057 stated in Example 3, last sentence, that aminoanthraquinone will react readily and smoothly with perylenetetracarboxylic acid to form the corresponding imide dyes. Contrary to the statement in the said specification, however, it is impossible to obtain these dyes under the condition therein described, i.e., without a condensing agent. Even with zinc chloride, the reaction proceeds unsatisfactorily and leads to heterogeneous products.

α- and β-aminoanthraquinones, which may bear further substituents, may for example by used as aminoanthraquinones. 1,2-diaminoanthraquinone may also be smoothly reacted with perylene-3,4,9,10-tetracarboxylic acid or its anhydride in the presence of the said zinc or cadmium salts. A violet vat dye having good all-round fastness is thus obtained which cannot be otherwise obtained readily filterable by suction and in this purity.

Compounds which may be used as dyes or dye intermediates either direct or after conventional preparation, are obtained by the process of the present invention. Some of the compounds obtainable according to the invention are valuable pigments which, after having been converted into a finely divided form, are suitable for dyeing organic products, such as lacquers or plastic compositions, as printing inks or for spin-dyeing artificial fibers. Other products of the process are vat dyes which in some cases exhibit a fastness to soda boiling that is surprisingly good for perylenimide dyes.

The invention is further described in the following illustrative examples in which parts are parts by weight. Parts by volume bear the same relation to parts by weight as the liter (S.T.P.) to the kilogram. The temperatures are given in degrees centigrade.

*Example 1*

9.8 parts of perylene-3,4,9,10-tetracarboxylic dianhydride, 12.5 parts of 4-aminoazobenzene and 4.6 parts of crystallized zinc acetate are introduced consecutively into 130 parts by volume of quinoline while stirring. The mixture is heated to 230° to 235° C. while leading a weak current of air or nitrogen through it and kept at this temperature for one hour. The condensation product which separates in the form of blunt red crystals is suction filtered, washed with quinoline, then with methanol and finally with water. It is boiled with dilute caustic soda solution to remove any perylenetetracarboxylic acid present and then washed until neutral with hot water and dried. Perylene-3,4,9,10-tetracarboxylic-bis-[4-phenyl-azo]-phenylimide is obtained in an excellent yield and great purity.

A similar product is obtained if the quinoline in the above example be replaced by diethylaniline, trichlorobenzene, diphenyl, diphenylene oxide or a eutectic mixture thereof.

form, is suction filtered at about 100° and processed in the way described in Example 1. It is obtained in the form of red crystals which dissolve in sulfuric acid with a red color having a blue fluorescence. The compound is more yellowish than the dye according to Example 1. It has the constitution:

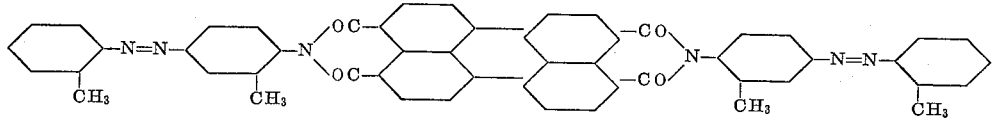

Example 2

0.5 part of finely powdered zinc oxide and 0.75 part of glacial acetic acid are introduced into 110 parts by

Example 5

The o-aminoazotoluene in Example 4 is replaced by 30.6 parts of 2-methyl-4-amino-4'-chloroazobenzene. The dye having the constitution:

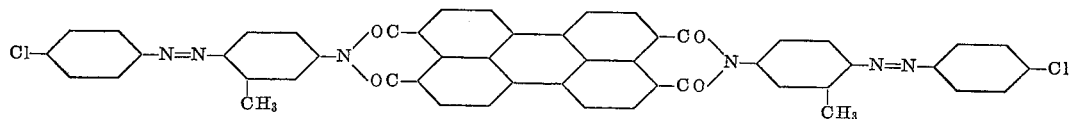

volume of quinoline. The whole is heated to 100° C. and 9.8 parts of perylene-3,4,9,10-tetracarboxylic dianhydride and 12.5 parts of 4-aminoazobenzene are then added consecutively. While passing a weak current of air or nitrogen through, the whole is heated to boiling temperature and the reaction mixture is kept at 230° to 235° C. for one hour. The condensation product which separates in crystalline form is suction filtered at 100° and processed as described in Example 1. It is the same dye as that obtained in Example 1.

The same result is obtained if the acetic acid in the above example be replaced by 0.7 part of 85% formic acid, 0.95 part of propionic acid or 3.5 parts of stearic acid.

Example 3

1 part of finely powdered zinc oxide and 3.1 parts of benzoic acid are introduced into 100 parts by volume of quinoline. The whole is heated to 100° and 9.8 parts of perylene-3,4,9,10-tetracarboxylic acid and 15 parts of 4-aminoazobenzene are added. Heating is continued at 230° to 235° while passing through a weak current of air or nitrogen. The reaction mixture is processed as described in Example 1. The dye obtained is the same as that prepared according to Example 1.

The same result is achieved if the benzoic acid in the above example be replaced by 4.2 parts of phthalic acid, 4 parts of phenylacetic acid, 3.2 parts of hexahydrobenzoic acid or 3.1 parts of nicotinic acid.

Example 4

19.6 parts of perylene-3,4,9,10-tetracarboxylic dianhydride, 34 parts of o-aminoazotoluene and 9.2 parts of crystallized zinc acetate are introduced into 200 parts by volume of quinoline. The mixture is heated for one hour at 230° to 235° while passing air or nitrogen through. The condensation product, which separates in crystalline is obtained in the form of red needles; it gives a violet vat and dissolves in sulfuric acid with a blue-red color.

Example 6

110 parts by volume of quinoline, 9.8 parts of perylene-3,4,9,10-tetracarboxylic anhydride, 15.5 parts of 4-phenyl-azo-1-naphthylamine and 4.6 parts of zinc acetate are heated for six hours at 230° to 235° while passing through a weak current of nitrogen. The red condensation product is suction filtered at 100° and processed conventionally. The dye has the constitution:

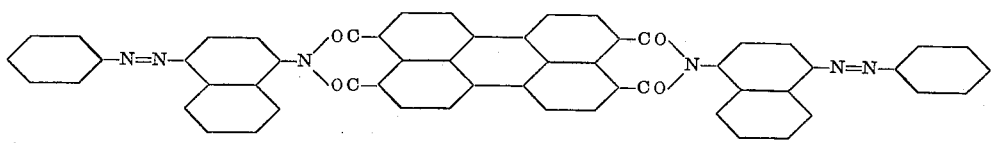

It dyes cotton bluish red shades from a violet vat. It dissolves in sulfuric acid with a blue-red color having a blue fluorescence.

Example 7

39.2 parts of perylene-3,4,9,10-tetracarboxylic dianhydride, 56 parts of 1-aminoanthraquinone and 18 parts of zinc acetate are heated for five hours at 230° to 235° in 120 parts by volume of quinoline while passing through air or nitrogen. The deposited red lamellar crystals are suction filtered at about 150°, washed with hot quinoline, alcohol and water, then boiled up with dilute caustic soda solution, washed until neutral and dried. The dye obtained has the constitution:

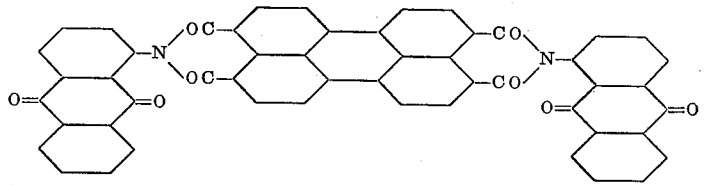

It dissolves in concentrated sulfuric acid with a blue-red color having blue fluorescence. It is extremely sparingly soluble in organic solvents. Cotton is dyed rose shades from a violet vat.

If the 1-aminoanthraquinone in the above example be replaced by 2-aminoanthraquinone, blue-red crystals are obtained which dissolve in sulfuric acid with a red color having blue fluorescence and dye cotton bluish red shades from a blue-red vat.

Example 8

3.9 parts of perylene-3,4,9,10-tetracarboxylic dianhydride, 6 parts of 1,4-diamino-2-acetylanthraquinone and 1.8 parts of zinc acetate are heated at 230° to 235° in 110 parts of quinoline for two hours. The deposited dark blue-red crystals are suction filtered at 100° and further treated as in the preceding examples. The compound has the constitution:

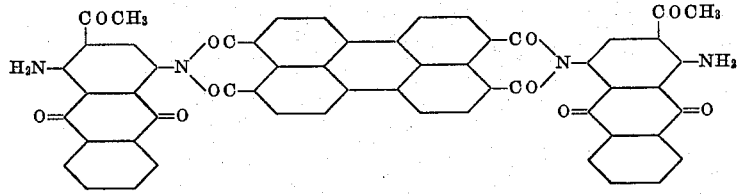

It dissolves in concentrated sulfuric acid with a blue-red color. It dyes cotton claret shades from a violet vat.

Example 9

19.6 parts of perylene-3,4,9,10-tetracarboxylic dianhydride, 30 parts of 1,2-diaminoanthraquinone and 9.2 parts of zinc acetate are heated for six hours with 300 parts of quinoline at 230° to 235° while passing through a weak current of nitrogen. The dark violet reaction product is suction filtered at 150°, washed with hot quinoline, alcohol and water, boiled up with dilute caustic soda solution, washed with water until neutral and dried. The product probably has the constitution:

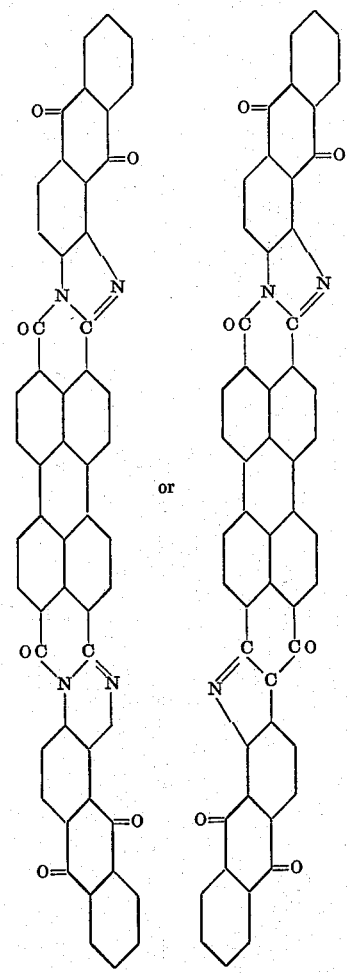

It dissolves in sulfuric acid giving a blue-green color and dyes cotton full violet shades having excellent all-round fastness from a violet vat.

Example 10

9.8 parts of perylene-3,4,9,10-tetracarboxylic anhydride, 9 parts of 2-aminopyrimidine and 4.6 parts of zinc acetate are boiled with 110 parts by volume of quinoline for one hour while passing through a current of nitrogen. The deposited dark blue red lamellar crystals are suction filtered at 100° and processed in the usual way. The reaction product dissolves in sulfuric acid with a blue-red color. It dyes cotton rose shades from a violet vat and has the following constitution:

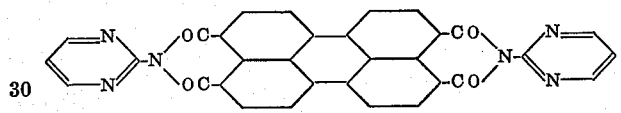

We claim:
1. In the process for the production of a perylene-tetracarboxylic imide by condensing a compound selected from the group consisting of perylene-3,4,9,10-tetracarboxylic acid and perylenetetracarboxylic anhydride with a primary aromatic amine at a temperature of about 150° C. to 330° C. in the presence of a high boiling inert organic solvent as the condensation reaction medium, the improvement which comprises carrying out the condensation reaction in the presence of the metal salt of an organic acid wherein the metal is selected from the class consisting of zinc and cadmium and the organic acid is selected from the class consisting of formic acid, acetic acid, propionic acid, butyric acid, stearic acid, benzoic acid, phthalic acid, hexahydrobenzoic acid, phenylacetic acid and nicotinic acid.
2. A process as claimed in claim 1 wherein said metal salt is produced in situ from said organic acid and a compound selected from the class consisting of zinc oxide and cadmium hydroxide.
3. A process as claimed in claim 1 wherein said primary aromatic amine is an amino-azobenzene.
4. A process as claimed in claim 1 wherein said primary aromatic amine is a phenylazo-naphthylamine.
5. A process as claimed in claim 1 wherein said primary aromatic amine is an amino-anthraquinone.
6. A process as claimed in claim 1 wherein said primary aromatic amine is 4-aminoazobenzene.
7. A process as claimed in claim 1 wherein said primary aromatic amine is o-aminoazotoluene.

References Cited
UNITED STATES PATENTS
2,715,127   8/1955   Meier et al. _____ 260—281

CHARLES B. PARKER, *Primary Examiner.*

FLOYD D. HIGEL, *Assistant Examiner.*